Figure 1:
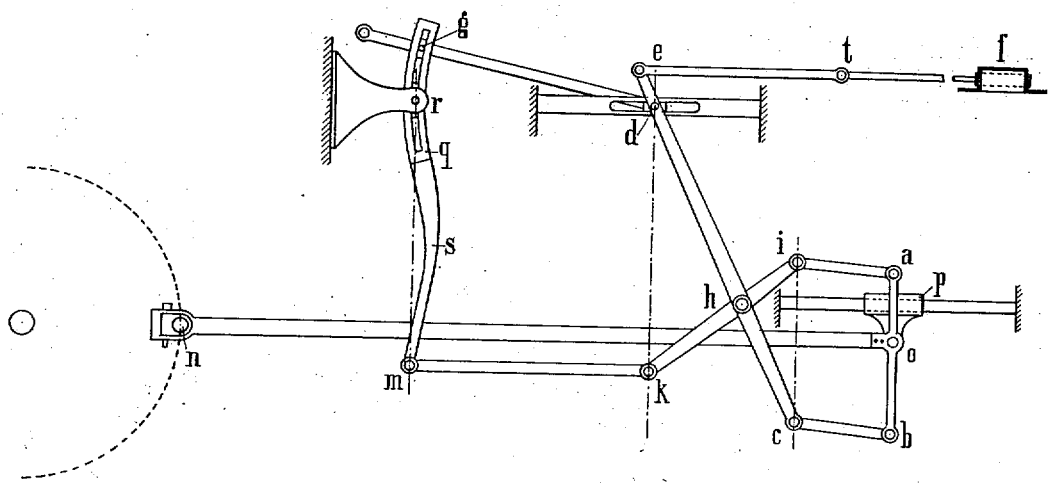

M. SAWELJEW.
LINK DISTRIBUTING GEAR.
APPLICATION FILED MAY 22, 1911.

1,019,921.

Patented Mar. 12, 1912.
5 SHEETS—SHEET 1.

Witnesses:
R. I. Hulsizer.
N. P. Leonard.

Michael Saweljew
Inventor
by Byrnes, Townsend & Brickenstein,
Attorneys.

M. SAWELJEW.
LINK DISTRIBUTING GEAR.
APPLICATION FILED MAY 22, 1911.

1,019,921.

Patented Mar. 12, 1912.
5 SHEETS—SHEET 4.

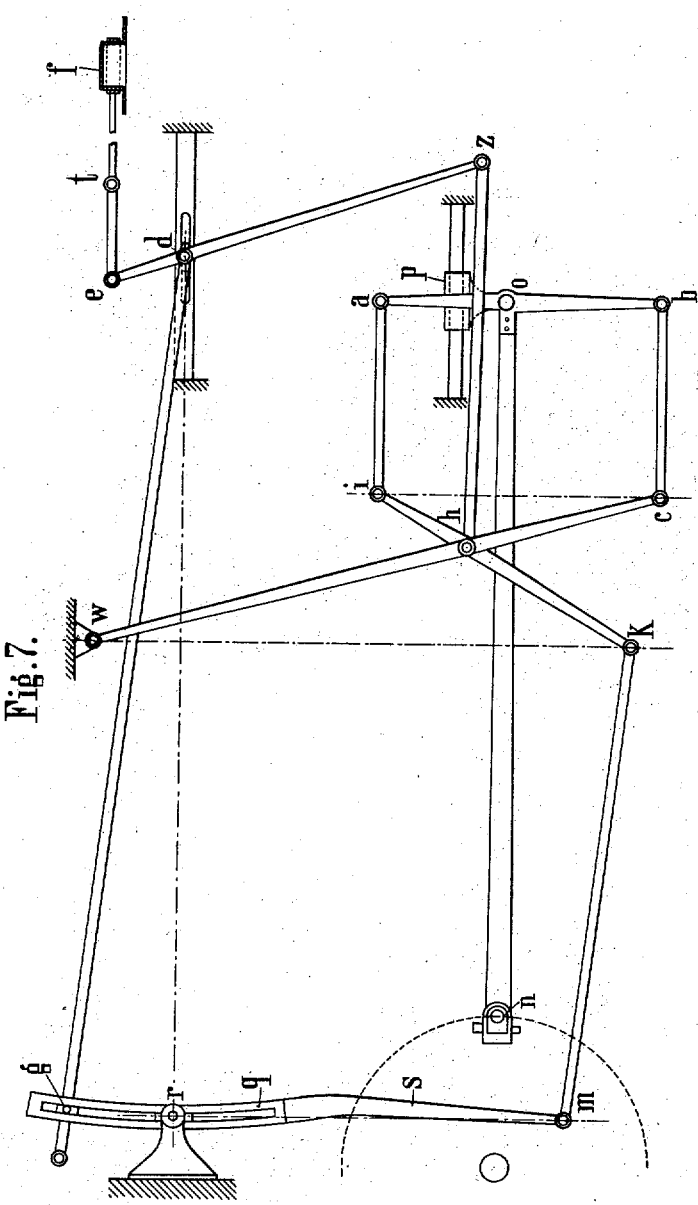

UNITED STATES PATENT OFFICE.

MICHAEL SAWELJEW, OF ST. PETERSBURG, RUSSIA, ASSIGNOR TO ALEXIS SIABLOFF, OF ST. PETERSBURG, RUSSIA.

LINK DISTRIBUTING-GEAR.

1,019,921. Specification of Letters Patent. Patented Mar. 12, 1912.

Application filed May 22, 1911. Serial No. 628,849.

*To all whom it may concern:*

Be it known that I, MICHAEL SAWELJEW, a subject of the Emperor of Russia, residing at St. Petersburg, Russia, have invented certain new and useful Improvements in or Relating to Link Distributing-Gear, of which the following is a specification.

The present invention relates to a link distributing gear, which is mainly intended for locomotives, and the characteristic feature of which consists in that the slide movement is effected from one single point, namely the cross-head, that is from a point having an absolutely rectilinear motion.

A link gear according to the present invention has the advantage, that it will produce an almost symmetrical distribution of steam on both sides of the piston and an absolutely equal linear lead, without the accuracy of the movements being to any considerable degree affected by the engine rocking on its springs, as is the case with other known link gears.

A further advantage consists in the fact, that the correctness of the adjustments of the gear may at any time be gaged and corrected with aid of the most simple means in contradistinction to the known link distributing gears, in which the correct distribution of the steam depends on the proper adjustment of the eccentric and the auxiliary crank. An examination of the correctness of the adjustment of the latter however and a readjustment can be effected by a thorough overhauling of the locomotive axles only.

According to the present invention the movements of the slide valve are produced by means of a rod rigidly connected to the connecting rod coupling the driving wheel with the cross-head. To the ends of this rod are secured link bars which are connected by means of two levers fulcrumed in the manner of shears to a link and a slide valve actuating rod respectively. By the reciprocating movement of the piston the acting point of the valve rod is given a movement which is composed of an oscillatory movement produced by the link and a rotary movement of the one lever of the shears. For obtaining an almost equal distribution on both sides of the piston it is hereby necessary, that the straight lines connecting the several pairs of fulcrums namely the line between the oscillating point of the link and the point of attachment of the intermediate rod coupling it with the shears, and the line between the point of attachment of the link rod on the shears lever acting on the slide valve rod and the other oscillating point of the link connecting rod, finally the line between the points of attachment of the two shears levers, are vertical to the connecting rod at both dead center positions of the crank, and that the distance between the two lower points of attachment of the shears levers in both dead center positions remains constant.

In the accompanying drawings Figures 1–7 several embodiments of a link gear according to the present invention are shown in a diagrammatical manner.

In the embodiment according to Fig. 1, the cross-head $p$ is coupled with the driving wheel by means of a connecting rod $n$—$o$; at the fulcrum $o$, this rod carries a lever $a$—$b$ rigidly secured to it, to the outer ends of which link bars are fitted which operate the slide valve rods. The lever $a$—$b$ is rigidly connected to the connecting rod $n$—$o$ in such a manner, that the connecting lines between the fulcrum pins $n$, $o$ and the fulcrum pins $a$, $b$ include the same angle at all positions of the crank, and are preferably at right angles to each other. To the fulcrums $a$, $b$ are linked by means of bars $a$—$i$ and $b$—$c$, shears $c$—$e$ and $i$—$k$ respectively, which are pivotally connected at $h$. The bar $i$—$k$ is coupled by means of a link bar $m$—$k$ to the extension of a link $q$, which is pivotally suspended at $r$. In the said link moves a link block $g$, which is coupled by means of a bar to a slide-block $d$ on the shear lever $c$—$e$. The slide-block $d$ moves in a guide. The end $e$ of the shears lever $c$—$e$ is hinged to a bar $e$—$t$, which acts on a slide-valve $f$ of suitable form. In consequence of the reciprocating motion of the cross-head $p$ produced by the piston, the fulcrum $e$ will be reciprocated in a manner composed of two movements, namely a reciprocating movement which is produced by means of a rod $g$—$d$ by the oscillations of the link and a movement, which is produced by the relative rotation of the shears lever $c$—$e$ around the fulcrum $d$. The arrangement of the several levers is made in such a manner, that the points $i$, $c$ and $d$, $k$ and $r$, $m$ respectively are vertically beneath each other at both dead center positions of the piston, so that the lines connecting them respectively will be at right angles to the line connecting the fulcrums $n$, $o$.

Figure 2:
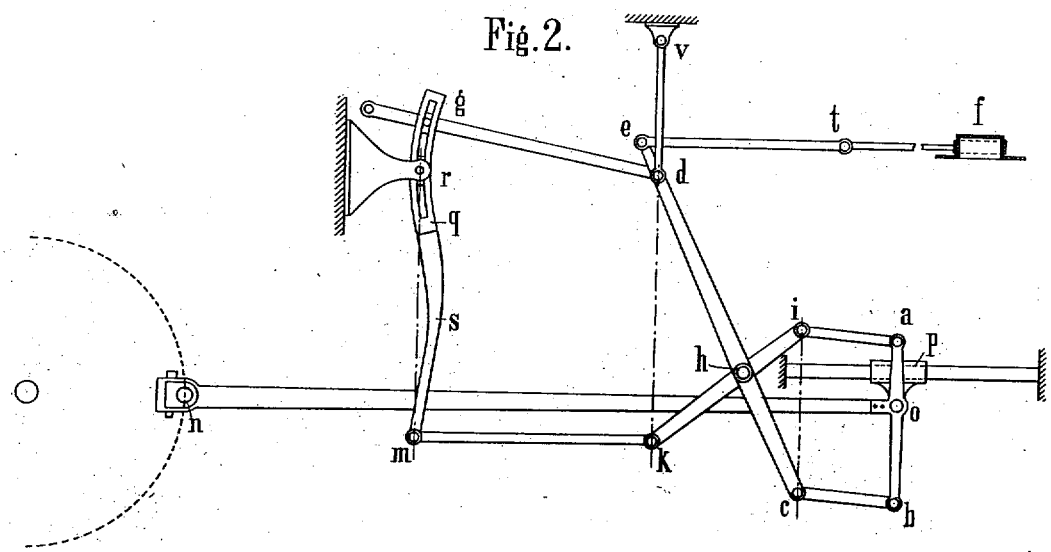

The embodiment according to Fig. 2 corresponds in its general arrangement with that shown in Fig. 1, with the exception only, that point $d$ is not guided in a rectilinear manner but is pivotally suspended at $v$ by means of rod $v$—$d$.

Figure 3:
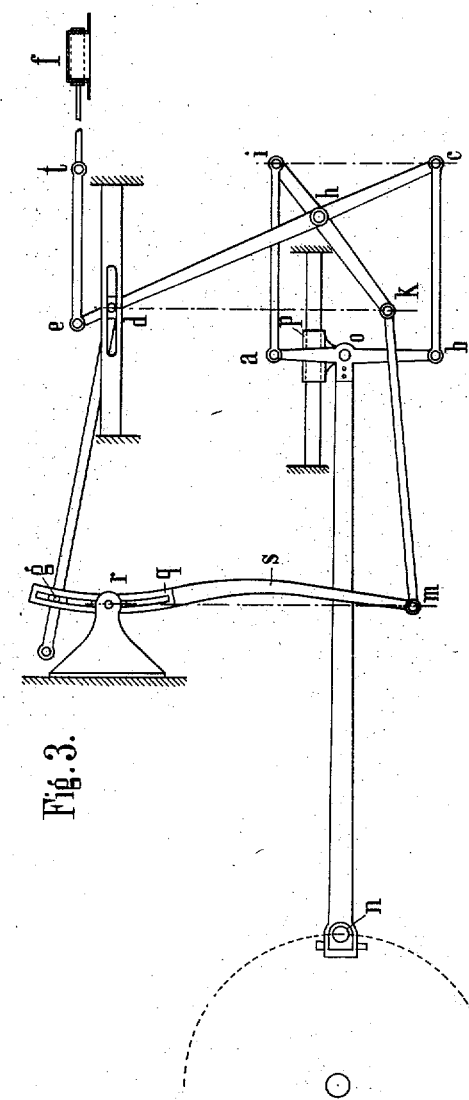

In the embodiment according to Fig. 3 the bars forming the shears are arranged farther away from the driving wheel; otherwise the operation is the same.

Figure 4:
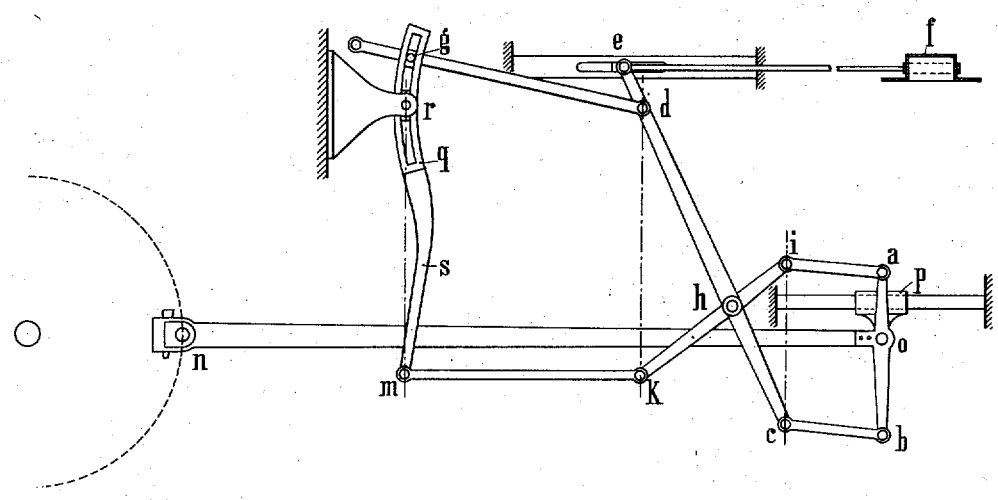

In the embodiment according to Fig. 4 the point of attachment of the slide bar itself is guided in a rectilinear manner, so that the shears lever can be coupled directly to the slide by means of a single bar. The link acts in this case below the guide.

Figure 5:
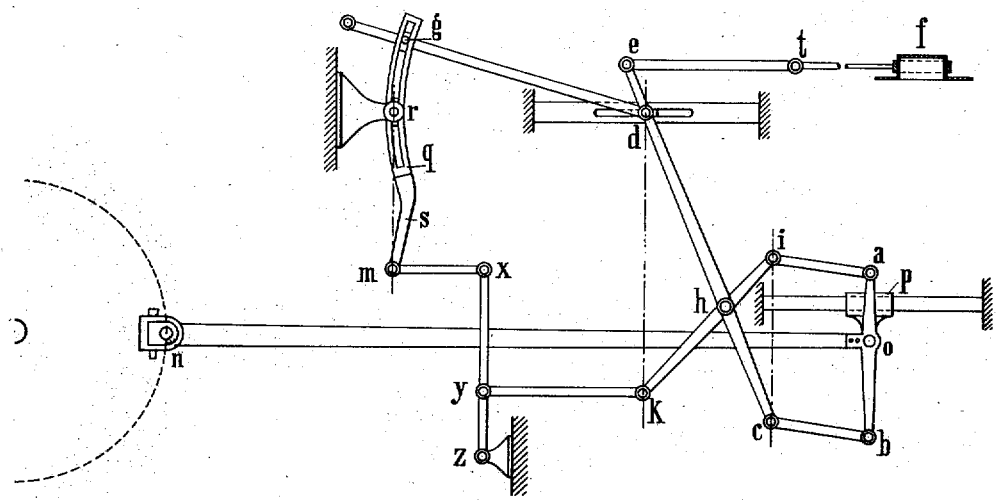

In the embodiment according to Fig. 5 the fulcrum $k$ of the shears lever $i$—$k$ is not coupled directly with the link fulcrum $m$, but by an intermediate rocking lever $x$—$z$, the fulcrum $z$ of which is rigidly fixed at a suitable point on the locomotive, while the fulcrum $x$ is coupled with the fulcrum $m$ by means of a bar $m$—$x$. The fulcrum $k$ is coupled to the rocking lever $x$—$z$ by means of a bar $k$—$y$.

All these constructional forms refer to slide valves with outer steam admission.

Figure 6:
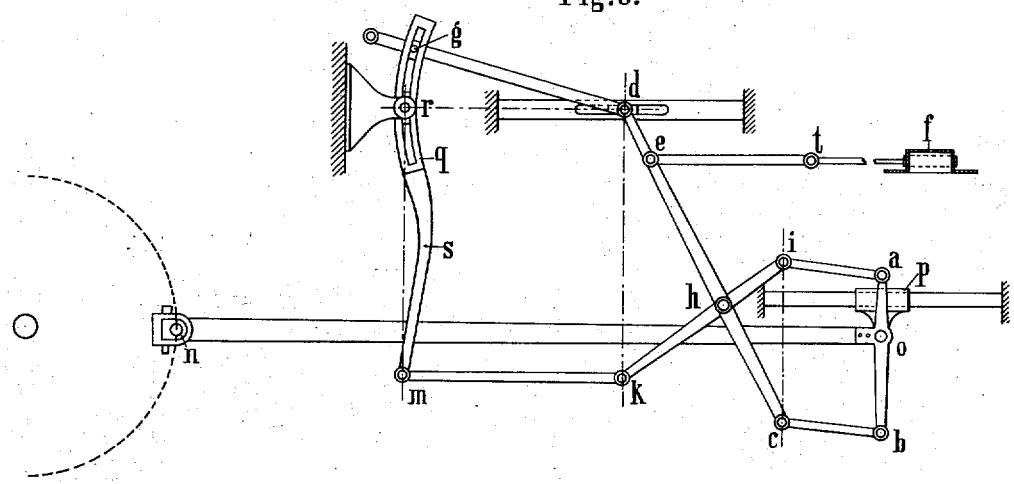

In Fig. 6 a constructional form is shown for interior admission, which substantially resembles the embodiment according to Fig. 1, with the exception that the point of attachment $e$ of the slide valve rod is arranged inwardly toward the fulcrum $h$ of the shears. It is obvious that also the other embodiments may in the same manner be arranged for interior steam admission.

In the embodiment according to Fig. 7 one of the shears levers $w$—$c$ is pivotally suspended at $w$. The slide valve motion itself is effected by means of a rod $e$—$z$, which at the point $d$, guided in a rectilinear manner, is by means of a bar $d$—$g$ pivoted to the link $q$. The lower end of the slide valve operating lever $e$—$z$ is coupled to the fulcrum $h$ of the shears levers. If therefore the cross-head $p$ reciprocates, it will give the point $e$ a movement, which is composed of a longitudinal movement resulting from the action of the link $q$ and a further longitudinal movement resulting from the rocking of the bar $e$—$z$ around the point $d$ caused by the connecting bar $h$—$z$.

If the distributing gear is to work in a proper manner and produce a distribution of steam as equal as possible on both sides, the lines connecting the several fulcrums, as for instance the points $i$—$c$ or $d$—$k$ or $r$—$m$ must in all the different embodiments be at right angles to the lines connecting the connecting rod centers $n$—$o$, when the piston is in its dead center positions. Besides the distance between the fulcrums $k$ and $c$ must be the same at both dead centers; this is only possible if the former condition is fulfilled.

It is evident, that it will be sufficient for controlling the correctness of the adjustment, to examine the distance between the points $k$ and $c$ at the two dead center positions of the piston. This examination can be easily carried out, without the locomotive having to be moved. It will be sufficient to place the piston in its rear dead center position and then measure the distance between the points $k$ and $c$. Then the connecting rod is disconnected from the crank pin, the piston rod is moved into the front dead center position and secured between the parallel bars in the direction of the cylinder axis. Then it must be ascertained whether the distance between the points $k$ and $c$ is the same at this position, as at the other dead center position of the piston. If this is not the case, the gear is wrongly adjusted and should be revised and readjusted.

What I claim is:

1. In a link distributing gear, a cross-head adapted to actuate a steam distributing valve, a driving wheel for said cross-head, a rod connecting said cross-head and said driving wheel and pivoted thereto, a bar rigidly secured to said connecting rod, shears-levers in pivotal connection with each end of said bar, an oscillating link, connecting means between said shears-levers and said oscillating link, and connecting means between said steam valve and said shears-levers.

2. In a link distributing gear, a cross-head adapted to actuate a steam distributing valve, a driving wheel for said cross-head, a rod connecting said cross-head and said driving wheel and pivoted thereto, a bar rigidly secured to said connecting rod, shears-levers in pivotal connection with each end of said bar, an oscillating link, connecting means between said shears-levers and said oscillating link and said steam valve, and a pivotal connection of the valve actuating shears-lever with a support.

3. In a link distributing gear, a cross-head adapted to actuate a steam distributing valve, an oscillating link, a driving wheel for said cross-head, a rod connecting said cross-head and said driving wheel and pivoted thereto, a bar rigidly secured to said connecting rod, link- and valve-actuating levers in pivotal connection with each end of said bar, a pivotal connection of the valve-actuating lever with a support, means for connecting said oscillating link to each of said actuating levers, and means for connecting said valve-actuating lever to said valve.

4. In a link distributing gear, a cross-head adapted to actuate a steam distributing valve, a driving wheel for said cross-head, a rod connecting said cross-head and said driving wheel and pivoted thereto, a bar rigidly secured to said connecting rod, shears-levers in pivotal connection with said bar, an oscillating link, means for pivotally connecting said oscillating link to each of said shears-levers, a pivotal connection of the valve-actuating shears-lever with a support, and means carried by said supporting device for positively guiding the pivot point of said valve-actuating shears lever.

5. In a link distributing gear, a cross-head adapted to actuate a steam distributing valve, a driving wheel for said cross-head, a rod connecting said cross-head and said driving wheel and pivoted thereto, a bar rigidly secured to said connecting rod, shears-levers in pivotal connection with said bar, an oscillating link, means for pivotally connecting said oscillating link to each of said shears-levers, a pivotal connection of the valve-actuating shears-lever with a support, and means carried by said supporting device for guiding the pivot point of said valve-actuating shears-lever in a straight line.

6. In a link distributing gear, a cross-head adapted to actuate a steam distributing valve, a driving wheel for said cross-head, a rod connecting said cross-head and said driving wheel and pivoted thereto, a bar rigidly secured to said connecting rod, shears-levers in pivotal connection with said bar, an oscillating link, means for pivotally connecting said oscillating link to each of said shears-levers, a pivotal connection of the valve-actuating shears-lever with a support, and a slide-bar for a pivot point of said valve-actuating lever.

7. In a link distributing gear, a cross-head adapted to actuate a steam distributing valve, a driving wheel for said cross-head, a rod connecting said cross-head and said driving wheel and pivoted thereto, a bar rigidly secured to said connecting rod, shears-levers in pivotal connection with said bar, an oscillating link, means for pivotally connecting said oscillating link to each of said shears-levers, a pivotal connection of the valve-actuating shears-lever with a support, means carried by said supporting device for guiding the pivot point of said valve-actuating lever in a straight line, and a direct connection of said pivot point to a valve-actuating reciprocating rod.

8. In a link distributing gear, a cross-head adapted to actuate a steam-distributing valve, an oscillating link, a driving wheel for said cross-head, a rod connecting said cross-head and said driving wheel and pivoted thereto, a bar rigidly secured to said connecting rod, link- and valve-actuating levers in pivotal connection with each end of said bar, a pivotal connection of the valve-actuating lever with a support, means for connecting said oscillating link to each of said actuating levers, and means for connecting said valve-actuating lever to said valve, the parts being so arranged that the lines connecting the fulcrum points $i$—$c$, $d$—$k$, and $v$—$m$ are each at right angles to the line connecting the connecting rod centers $n$—$o$, when the piston is in its dead center position, as and for the purpose shown and described.

9. In a link distributing gear, a cross-head adapted to actuate a steam distributing valve, a driving wheel for said cross-head, a rod connecting said cross-head and said driving wheel and pivoted thereto, a bar rigidly secured to said connecting rod, shears-levers in pivotal connection to each end of said bar, an oscillating link, connecting means between said shears-levers and said oscillating link, and connecting means between said steam valve and said shears-levers, the arrangement being such that in opposite dead-center positions of the piston, the distance between the lever pivot points at the lower ends of the shears-levers is the same, as and for the purpose shown and described.

In testimony whereof, I affix my signature in presence of two witnesses.

MICHAEL SAWELJEW.

Witnesses:
H. A. LOVIAGUINE,
S. S. SIABLOFF.

---

Copies of this patent may be obtained for five cents each, by addressing the "Commissioner of Patents, Washington, D. C."